(12) United States Patent
Bulitta

(10) Patent No.: US 12,551,975 B2
(45) Date of Patent: Feb. 17, 2026

(54) MATERIAL POSITIONER FOR WELDING APPARATUS AND METHOD

(71) Applicant: MICRO PRODUCTS COMPANY, Peoria, IL (US)

(72) Inventor: Robert Bulitta, East Peoria, IL (US)

(73) Assignee: Micro Products Company, Peoria, IL (US)

( * ) Notice: Subject to any disclaimer, the term of this patent is extended or adjusted under 35 U.S.C. 154(b) by 0 days.

(21) Appl. No.: 18/399,999

(22) Filed: Dec. 29, 2023

(65) Prior Publication Data

US 2024/0131636 A1    Apr. 25, 2024

Related U.S. Application Data

(63) Continuation of application No. 16/987,401, filed on Aug. 7, 2020, now abandoned, which is a
(Continued)

(51) Int. Cl.
*B23K 37/00* (2025.01)
*B23K 37/04* (2006.01)
(Continued)

(52) U.S. Cl.
CPC ............ *B23K 37/053* (2013.01); *B23K 37/04* (2013.01); *B23K 37/0408* (2013.01); *B23K 2101/06* (2018.08); *B23K 2101/32* (2018.08)

(58) Field of Classification Search
CPC .............. B23K 37/053; B23K 37/0408; B23K 2101/06; B23K 2101/32; B23K 37/0435;
(Continued)

(56) References Cited

U.S. PATENT DOCUMENTS 3,245,201 A    4/1966   Richardson
3,600,580 A *  8/1971   Vogel ..................... G01T 1/29
                                              250/306
(Continued)

FOREIGN PATENT DOCUMENTS

CA        2396259 A1 *   7/2011
CN     101584136 A  *  11/2009 ........... H03D 13/004
(Continued)

OTHER PUBLICATIONS

Heinze, C. et al., "Numerical Calculation of Residual Stress Development of Multi-pass Gas Metal Arch Welding Under High Restraint Conditions", Materials and Design, vol. 35, 2012, pp. 201-209.
(Continued)

*Primary Examiner* — Kiley S Stoner
(74) *Attorney, Agent, or Firm* — Cook Alex Ltd.

(57) ABSTRACT

A material positioner can utilize characteristics of the material being welded to locate the material to be welded. In some embodiments, the material positioner has a voice coil actuator (VCA) for material positioning. In some embodiments, the VCA is sent a signal based on the characteristics of the material being welded and/or the type of weld being completed. In at least some embodiments, a single welder can be used over a wide range of materials. In some embodiments, end-uses that require components to be in generally mating engagement for further processing can benefit from a material positioner.

20 Claims, 3 Drawing Sheets

Related U.S. Application Data continuation of application No. PCT/US2019/017084, filed on Feb. 7, 2019.

(60) Provisional application No. 62/627,691, filed on Feb. 7, 2018.

(51) Int. Cl.
*B23K 37/053* (2006.01)
*B23K 101/06* (2006.01)
*B23K 101/32* (2006.01)

(58) Field of Classification Search
CPC .... B23K 37/04–0538; B23K 9/00–328; B23K 11/00–368; B23K 15/00–10; B23K 20/12–1295; B23K 26/00–707
USPC ............ 228/44.4–49.6, 112.1–114.5, 2.1–2.3
See application file for complete search history.

(56) References Cited

U.S. PATENT DOCUMENTS

| | | | |
|---|---|---|---|
| 3,938,797 A | 2/1976 | Frederick | |
| 5,330,089 A * | 7/1994 | Orcutt | B23K 20/002 318/135 |
| 5,853,655 A | 12/1998 | Baker | |
| 6,533,158 B2 * | 3/2003 | Oishi | B23K 20/004 228/4.5 |
| 6,706,130 B1 * | 3/2004 | Minamitani | H01L 24/75 228/2.1 |
| 6,783,052 B2 | 8/2004 | Liao et al. | |
| 6,786,392 B2 * | 9/2004 | Nogawa | H01L 24/85 228/110.1 |
| 6,899,262 B2 | 5/2005 | Gaunekar et al. | |
| 7,532,428 B2 | 5/2009 | Kwan et al. | |
| 7,774,917 B2 | 8/2010 | Anderson et al. | |
| 7,820,938 B2 | 10/2010 | Gobez et al. | |
| 2001/0024419 A1 | 9/2001 | Oowaki et al. | |
| 2002/0063144 A1 | 5/2002 | Yamaguchi et al. | |
| 2004/0099711 A1 * | 5/2004 | Liao | H01L 24/78 228/180.5 |
| 2004/0232203 A1 * | 11/2004 | Gaunekar | B25B 5/06 228/180.5 |
| 2005/0199600 A1 | 9/2005 | Ruthven et al. | |
| 2005/0279805 A1 * | 12/2005 | Wong | H01L 24/78 228/4.5 |
| 2008/0196631 A1 * | 8/2008 | Kosmowski | B23K 26/02 108/20 |
| 2009/0315536 A1 * | 12/2009 | Koch | G01R 19/20 324/117 R |
| 2010/0044355 A1 * | 2/2010 | Nomaru | B23K 26/048 219/121.67 |
| 2010/0258535 A1 | 10/2010 | Fukutani et al. | |
| 2012/0055910 A1 | 3/2012 | Sakai et al. | |
| 2013/0181037 A1 * | 7/2013 | Nagai | H05K 13/0465 228/103 |
| 2014/0338841 A1 | 11/2014 | Johnson | |
| 2017/0189982 A1 * | 7/2017 | Hsu | B65H 51/18 |
| 2017/0203379 A1 * | 7/2017 | Matsumoto | B23K 1/0016 |
| 2017/0244310 A1 * | 8/2017 | Candiloro | H02K 11/33 |
| 2019/0351501 A1 | 11/2019 | Vandenberg et al. | |

FOREIGN PATENT DOCUMENTS

| | | | | |
|---|---|---|---|---|
| CN | 104174983 A | * | 12/2014 | .......... B23K 11/002 |
| CN | 205105260 U | * | 3/2016 | |
| CN | 106346151 A | * | 1/2017 | |
| CN | 107000059 A | * | 8/2017 | ............. B22F 10/25 |
| CN | 107160050 A | * | 9/2017 | ............. B23K 28/02 |
| JP | H162004260991 A | | 9/2004 | |
| JP | 4268360 B2 | * | 9/2009 | ............. B23K 20/12 |
| WO | 2018233193 A1 | | 12/2018 | |
| WO | 2019074612 A1 | | 4/2019 | |

OTHER PUBLICATIONS

Dirk Schrbpfer et al., "Einfluss der Warmefuhrung auf die Beanspruchungen in MehrlagenschweiBverbindungen aus hochfestem Feinkornbaustahl", dated Nov. 13, 2013.

Fricke, W. et al., "Application of Welding Simulation to Block Joints in Shipbuilding and Assessment of Welding-Induced Residual Stresses and Distortions", Int. J Nav. Archit. Ocean Eng., vol. 6, 2014, pp. 459-470.

International Search Report and Written Opinion dated Jul. 16, 2019, in connection with International Application No. PCT/US2019/017084.

International Preliminary Report on Patentability date Aug. 20, 2020, issued in connection with International Application No. PCT/US2019/017084.

* cited by examiner

MATERIAL POSITIONER FOR WELDING APPARATUS AND METHOD

CROSS-REFERENCE TO RELATED APPLICATION

This application claims priority to and is a continuation of U.S. application Ser. No. 16/987,401 filed on Aug. 7, 2020, entitled "Material Positioner for Welding Apparatus and Method". The '401 application is a continuation of international application No. PCT/US2019/017084 filed on Feb. 7, 2019, also entitled "Material Positioner for Welding Apparatus and Method". The '084 application claimed priority benefits from U.S. provisional patent application Ser. No. 62/627,691 filed on Feb. 7, 2018, entitled "Material Positioner for Welding Apparatus and Method".

This application also claims priority benefits from the 691 and '084 applications. The '401, '691 and '084 applications are hereby incorporated by reference herein in their entireties.

FIELD OF THE INVENTION

The present invention relates generally to a material positioner that locates the material to be welded and, more particularly, to a material positioner that utilizes characteristics of the material being welded to locate the material to be welded.

The welding industry has typically used several different processes to weld material together. For example, resistance welding is one technique to generate heat which coalesces two abutting materials in the weld area. In this example, previous designs use standard mechanisms to position the material being welded, such as, spring(s), pneumatics, and hydraulics.

One problem with past designs is the ability to provide a quality weld combined with the desire to have a high process productivity. Quality of the weld is a characteristic of the positioning of the material in the weld area. Typical designs that use spring force to position the material have an inherent issue with the spring rate changing during the useful life of the spring causing less quality welds. The less quality welds can cause an increase of re-welding which lowers productivity and increases cost.

Another problem with past designs is the ability to use a single welder configuration to weld different materials. For example, different diameter wire requires different spring forces to properly position the materials being welded. With past designs, the welder configuration needs to be manually reconfigured to provide proper spring force. Manually reconfiguring the welder increases production time which impacts productivity and increases the cost of the end product that is welded together.

Yet another problem with past designs is the complexity of welder configurations and the added costs of installation and operation. For example, pneumatics and hydraulics can be used to provide the force necessary to locate the material being welded in the weld area. To operate over a wider range of materials means having large pneumatic or hydraulic cylinders to provide proper operation of the welder at the high end of the material being welded. These techniques are inefficient since the welder is matched to reach a maximum pressure value when not all material needs are required to be welded at the maximum pressure of the welder. For example, welding of small diameter strand wire will only use a small percentage of the welder capacity compared to applications where one-inch (2.54 cm) diameter rods are being welded together.

SUMMARY OF THE INVENTION

In at least some embodiments, shortcomings of prior material positioners for use with a welder are overcome by a material positioner having a first fixture that has a first material secured to the first fixture, a second fixture that has a second material secured to the second fixture, a first positioning mechanism adapted to place the first material at a first starting point, and/or a second positioning mechanism adapted to place the second material at a second starting point. In at least some embodiments, the second starting point has the first and second material in generally mating engagement actuation as the second positioning mechanism generally forces the second material against the first material and locates the second material to a second position, and the second position has the first and second materials in general coalescence. In at least some embodiments, a control unit is adapted to send a signal to each of the first and second positioning mechanisms. In at least some embodiments, the signal is adjustable based on characteristics of the first and/or the second materials. In at least some embodiments, a heat generator adapted to weld the first and second materials to each other.

An exemplary method of positioning material for use with a welder is disclosed. In at least some embodiments, the welder has a first positioning mechanism, a second positioning mechanism, a first material having a first starting point, a second material having a second starting point and a second position, and/or a control unit that is adapted to send a signal to the first and second actuators. In at least some embodiments, the method can comprise the steps of placing the first material at the first starting point, placing the second material to the second starting point, sending the signal from the control unit to the second positioning mechanism, welding the first and second materials together, and/or placing the first and second materials in generally coalescent engagement.

DETAILED DESCRIPTION OF ILLUSTRATIVE EMBODIMENT(S)

Figure 1:
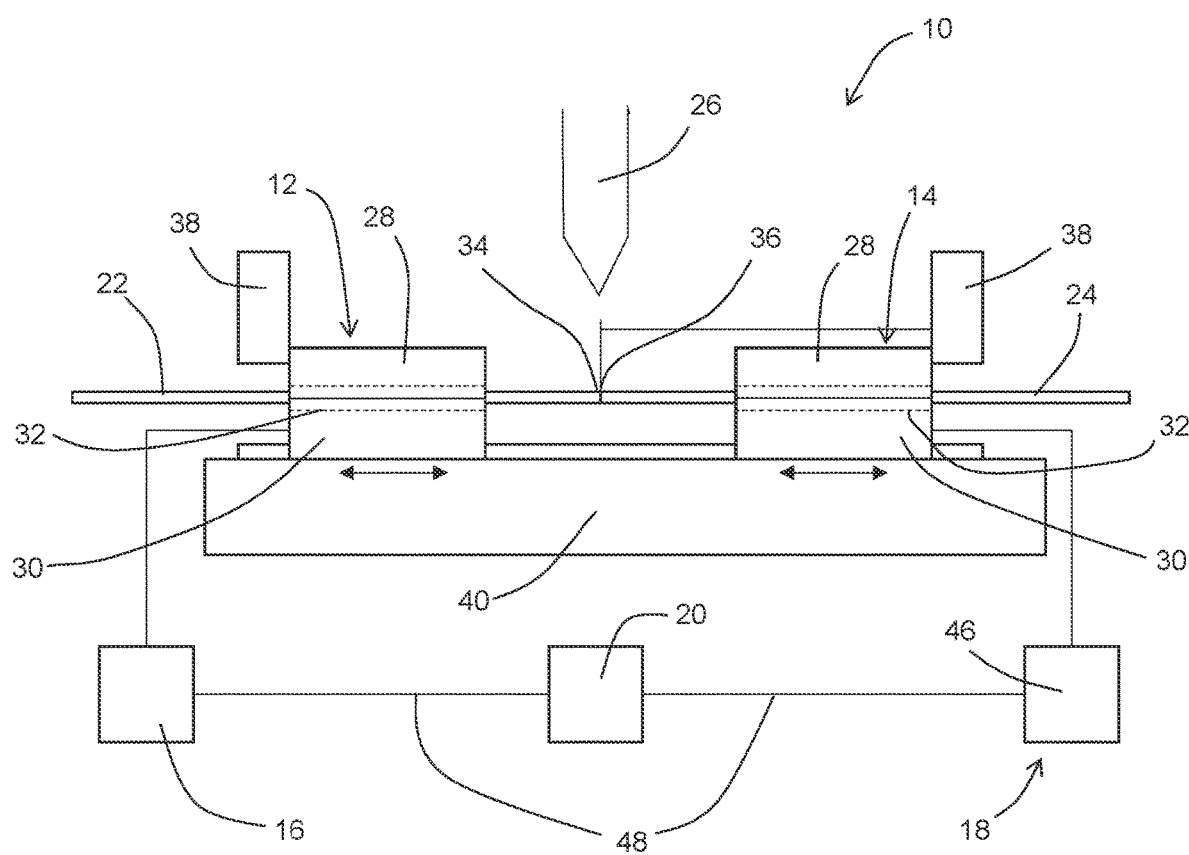
FIG. 1 is a front view of a material positioner and welder with a first material and a second material positioned at respective starting points for welding.

Turning to the drawings and particularly to FIG. 1, a front view of material positioner 10 for use with a welder is shown in one embodiment of the present material positioner. As shown therein, material positioner 10 can include first fixture 12, second fixture 14, first positioning mechanism 16, second positioning mechanism 18, and/or control unit 20. In the process of welding at least two materials: first material 22 and second material 24 together, it is often necessary to properly position the pieces in the weld area where heat generator welder 26 fuses the pieces together. In some embodiments, first fixture 12 and/or second fixture 14 can conform to the geometrical characteristics of the material being welded. For instance, in some embodiments, such as shown FIGS. 1-3, first material 22 and second material 24 corresponding to rods, can be secured to first fixture 12 and second fixture 14 using upper member 28 and lower member 30. In some embodiments, to properly align first material 22 and second material 24 horizontally groove 32 can be formed in upper member 28 and/or in lower member 30 to cradle the round rods in first fixture 12 and/or second fixture 14. In at least some embodiments, upper member 28 and lower member 30 are in an open position (not shown) for placement of the material in lower member 30. In at least some embodiments, once the material is placed in lower member 30, upper member 28 can be biased against the lower member 30 and the materials secured in first fixture 12 and/or second fixture 14. In some embodiments, a pneumatic actuation can be employed to maintain placement of the material(s) in first fixture 12 and/or second fixture 14. In some embodiments, other configurations can be employed, such as, but not limited to, a mechanical latch, hydraulics and springs. In addition, for explanation, the use of first material 22 and second material 24 having a rod-shaped configuration is discussed below. Other such materials can be employed, such as, but not limited to, solid wire, strand wire, flat stock, pipe and tubing.

Referring to FIG. 1, material positioner 10 is shown with first fixture 12 and second fixture 14 resting against a mechanical stop 38 with first fixture 12 and second fixture 14 at their corresponding first starting point 34 and second starting point 36. In some embodiments, mechanical stop 38 can be employed in combination with first fixture 12 and second fixture 14. In at least some embodiments, mechanical stop 38 can be adjustable to accommodate a range of first material 22 and/or second material 24. In at least some embodiments, larger rods generally require larger spacing between first fixture 12 and second fixture 14 for proper welding. In some embodiments, first fixture 12 and second fixture 14 can be slidably mounted to support member 40 for properly positioning first material 22 and second material 24 to corresponding first starting point 34 and second starting point 36, second position 42 (shown in FIG. 2) during welding, and third position 44 (shown in FIG. 3). In some embodiments, during use, the operator of the welder can physically slide the fixture until it contacts mechanical stops 38 and insert first material 22 and second material 24 into first fixture 12 and second fixture 14 before initiating the welding process. In at least some embodiments, when first material 22 and/or second material 24 are at their corresponding first starting point 34 and second starting point 36, this configuration generally corresponds to having first material 22 and second material 24 in generally mating engagement.

Figure 2:
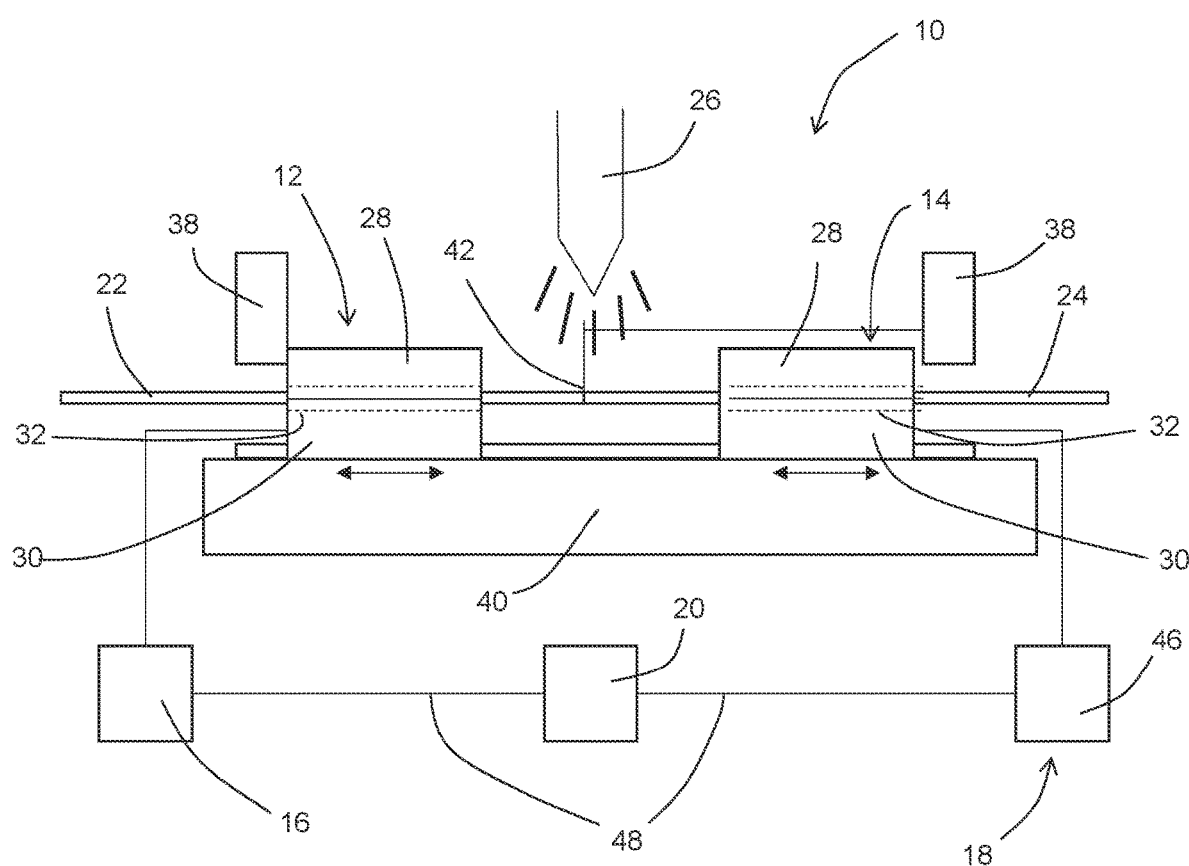
FIG. 2 is a front view of a material positioner and welder with a first material and a second material positioned to place the second material in a second position to start the welding process.
Figure 3:
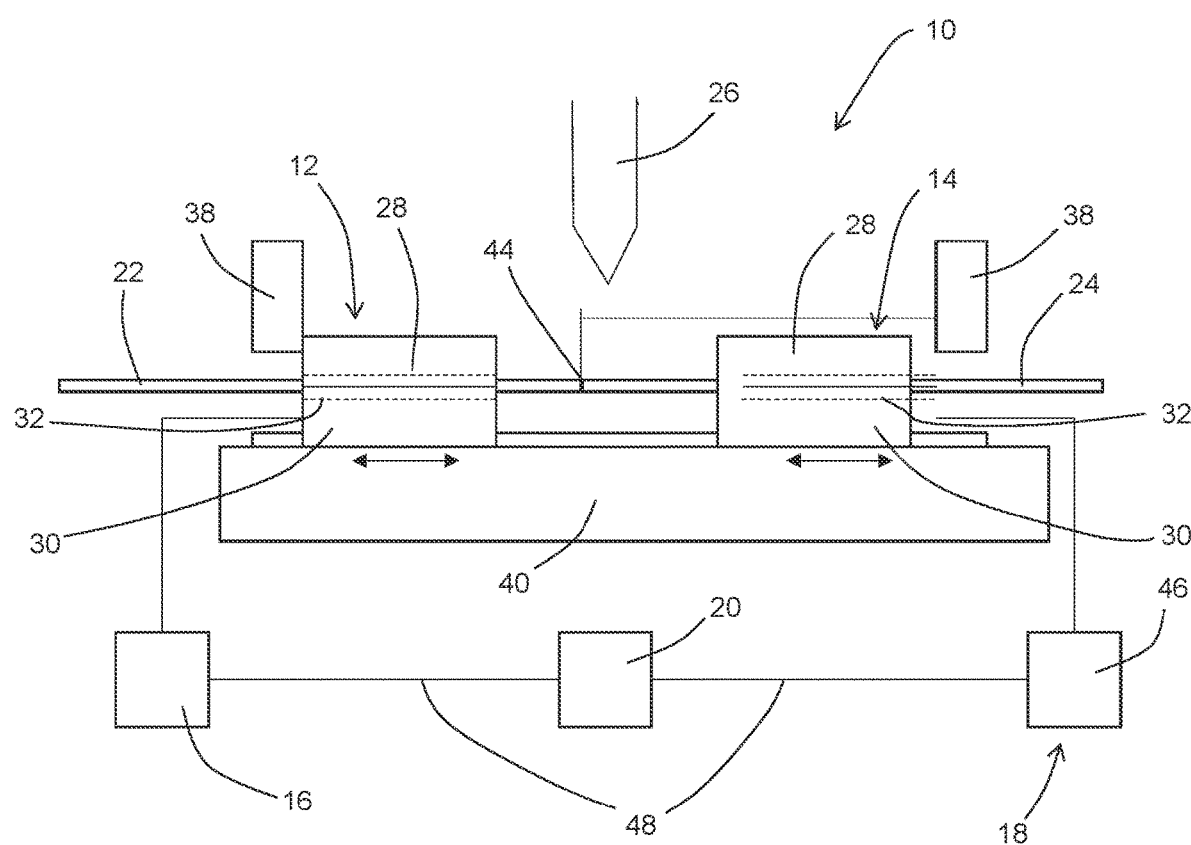
FIG. 3 is a front view of a material positioner and welder with a first material and a second material positioned after the completion of welding.

Referring to FIG. 2, material positioner 10 is shown with second fixture 14 positioned to place second material 24 in second position 42 for the start of the welding process. In at least some embodiments, actuation of second fixture 14 slides along support member 40 and generally forces second material 24 against first material 22. In at least some embodiments, second position 42 places first material 22 and second material 24 in a generally coalesced state during welding of first material 22 and second material 24. In some embodiments, control of the travel of second fixture 14 is important for completing a quality weld. In some embodiments, second positioning mechanism 18 can be voice coil actuator (VCA) 46 employed to position second material 24 with respect to first material 22. In some embodiments, control unit 20 can be adapted to send signal 48 to VCA 46. In some embodiments, based on signal 48, a permanent magnet (not shown) which can be part of VCA 46 can provide a generally constant force that is used to slide second fixture 14 with second material 24 to second position 42. In some embodiments, use of VCA 46 maintains a generally constant force over the life of VCA 46 whereas standard processes, such as those that use spring force for positioning, fluctuate during aging. In some embodiments, VCA 46 can provide a generally constant force during travel to second position 42, during the welding process, and third position 44, as the weld is cooled, increasing the quality of the weld. In some embodiments, control unit 20 can be a fixed power supply providing a predetermined voltage to VCA 46 based on the characteristics of first material 22 and/or second material 24. In some embodiments, other control units 20 can be employed, such as, but not limited to, a variable signal unit. In at least some embodiments, the magnitude of the voltage can be based on the characteristics of first material 22 and/or second material 24 being welded. In some embodiments, the user sends a higher or lower voltage signal 48 based on the properties of first material 22 and/or second material 24. For example, solid wire, strand wire, rod, flat stock, pipe, and/or tubing require different magnitudes of force to create proper welds. In addition, the size of first material 22 and second material 24 can require different magnitude of force at VCA 46 for welding. Furthermore, characteristics of the type of weld desired can require different magnitudes of force at VCA 46, for example, butt joints and lap joints. In some embodiments, the ability to adjust the force of VCA 46 over a wide range of operating parameters reduces the need to reconfigure welder 26 in operation. In some embodiments, with first material 22 and second material 24 in generally mating engagement, first starting point 34 and second starting point 36, welder 26 is activated and heat is generated to melt the ends of first material 22 and/or second material 24. In some embodiments, welder 26 can have other configurations, such as, but not limited to, resistance, spot, stud, friction, and/or energy beam. With second positioning mechanism 18 providing a constant force, welder 26 slides second fixture 14 to second position 42 to fuse first material 22 and second material 24 together for a quality weld. In at least some embodiments, once the weld is complete, welder 26 is deactivated and VCA 46 can continue to provide a generally constant force until welded first material 22 and second material 24 have cooled. Depending on tolerances within the welding process and/or properties of first material 22 and/or second material 24, the cooled pieces travel to third position 44, illustrated in FIG. 3. In some embodiments, third position 44 can vary from cycle to cycle based on the amount of time it takes to transition from a molten state to a solid state. For example, welder 26 may have an increase in heat generated for a single cycle which, in turn, melts more of first material 22 and/or second material 24. In at least some of these embodiments, a longer duration is then required to transition from a molten state to a solid state and, with a generally constant force applied, pushes second material 24 further into first material 22 and increases the travel to third position 44. In at least some embodiments, with the weld cooled, upper members 28 of first fixture 12 and second fixture 14 are retracted to provide access to the welded rod for removal and setup for another cycle of welder 26. In some embodiments, to reset second fixture 14, signal 48 to VCA 46 can be reversed. In at least some embodiments, reversing the signal overcomes the static force of second fixture 14 and places second fixture 14 at second starting point 36.

With reference to the figures, and in operation, productivity of welding first material 22 and second material 24 together, and in particular, employing a single welder 26 setup for a wide range of materials increases productivity while decreasing costs due to the use of VCA 46 for positioning first material 22 and second material 24 with a generally constant force during the welding process. For example, small gauge wire requires less force to maintain generally mating contact compared to a large diameter rod and VCA 46 can be adapted to handle a wide range of generally constant forces.

In at least some modes of operation, first material 22 and second material 24 are placed at first starting point 34 and second starting points 36 with first material 22 and second material 24 in generally mating contact. In at least some embodiments, the control unit can send signal 48 to VCA 46 which, in turns, provides a generally constant force to second fixture 14 which, in turn, provides a generally constant force between first material 22 and second material 24. With first material 22 and second material 24 in a solid state, the second fixture remains at second starting point 36. Welder 26 can be energized, providing heat to first material 22 and second material 24 to melt first material 22 and/or second material 24. During melting, second material 24 and second fixture 14 travel along support member 40 until it generally reaches second position 42 to better fuse the materials together for a quality weld. In at least some embodiments, with the weld completed, welder 26 is deactivated and VCA 46 continues to provide the constant force until the weld is cooled. In some embodiments, during transition from the molten state to the solid state, second material 22 and second fixture 14 can travel along support member 40 until it reaches third position 44. Welded first material 22 and second material 24 can be removed from first fixture 12 and second fixture 14. In at least some embodiments, first fixture 12 and second fixture 14 can be reset to first starting point 34 and second starting point 36 based on properties and/or characteristics of the material being welded. In some embodiments, the polarity of signal 48 can be reversed to VCA 46 providing an opposite magnitude of force and causing second fixture 14 to reverse travel and position second fixture 14 at second starting point 36. Reversed signal 48 can be of a general magnitude to overcome the static force of second fixture 14.

In at least some embodiments, the use of VCA 46 increases the capability of the welder to weld a wide range of materials of different geometries and properties under a variety of joining processes without reconfiguration of the welder. In addition, the ability to provide a generally constant force to first material 22 and second material 24 over the life of VCA 46 and in operation over the length of travel from first starting point 34 and second starting point 36 to second position 42, and to third position 44 can improve the quality of the welds made. Furthermore, in at least some embodiments, the use of VCA 46 simplifies the setup and lowers operation costs over standard and complex welders that employ spring(s), pneumatics or hydraulics.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of positioning material using a material positioner with a welder wherein said method comprises:
   placing a first material at a first starting point;
   placing a second material at a second starting point;
   sending a first signal from a control unit to a second positioning mechanism, wherein said second positioning mechanism is a voice coil actuator; and
   welding said first and second materials together,
   wherein said material positioner comprises:
      a first fixture having said first material secured to said first fixture;
      a first positioning mechanism adapted to place said first material at said first starting point;
      a second fixture having said second material secured to said second fixture;
      said second positioning mechanism adapted to place said second material at said second starting point; and
      said control unit adapted to send said first signal to said first positioning mechanism and said second positioning mechanism,
      wherein said first fixture comprises:
         a first fixture upper member; and
         a first fixture lower member with a first horizontal groove configured to cradle said first material.

2. The method of claim 1, wherein said second fixture comprises:
   a second fixture upper member; and
   a second fixture lower member with a second horizontal groove configured to cradle said second material.

3. The method of claim 2 wherein said first fixture upper member comprises a first upper horizontal groove configured to cradle said first material; and
   said second fixture upper member comprises a second upper horizontal groove configured to cradle said first material.

4. The method of claim 1 wherein said control unit is adapted to send said first signal to said first positioning mechanism and said second positioning mechanism, wherein said first signal is adjustable based on characteristics of said first material and said second material.

5. The method of claim 4, further comprising:
   sending a second signal to said second positioning mechanism to return said second positioning mechanism to said second starting point, wherein said second signal is of reversed polarity from said first signal sent to said second positioning mechanism.

6. The method of claim 5, wherein said second starting point has said first material and said second material in mating engagement, and
   wherein actuation of said second positioning mechanism forces said second material against said first material and locates said second material to a second position.

7. A method of positioning material using a material positioner with a welder wherein said method comprises:
   placing a first material at a first starting point;
   placing a second material at a second starting point;
   sending a first signal from a control unit to a second positioning mechanism, wherein said second positioning mechanism is a voice coil actuator;
   welding said first and second materials together; and
   sending a second signal to said second positioning mechanism to return said second positioning mechanism to said second starting point, wherein said second signal is of reversed polarity from said first signal sent to said second positioning mechanism, wherein said material positioner comprises:
a first fixture having said first material secured to said first fixture;
a first positioning mechanism adapted to place said first material at said first starting point;
a second fixture having said second material secured to said second fixture;
said second positioning mechanism adapted to place said second material at said second starting point; and
said control unit adapted to send said first signal to said first positioning mechanism and said second positioning mechanism,
wherein said second starting point has said first material and said second material in mating engagement, and
wherein actuation of said second positioning mechanism forces said second material against said first material and locates said second material to a second position,
wherein said control unit is adapted to send said first signal to said first positioning mechanism and said second positioning mechanism,
wherein said first signal is adjustable based on characteristics of said first material and said second material,
wherein said second position is in the same horizontal plane as said second starting point, and
wherein said second position has said first material and said second material coalesced.

8. The method of claim 6, wherein continued actuation of said second positioning mechanism locates said first material and said second material to a third position, said third position having said first material and said second material cooled.

9. The method of claim 8 wherein said third position has said first material and said second material transitioning from a molten state to a solid state.

10. The method of claim 1, wherein said first signal is a voltage.

11. The method of claim 10, wherein said voltage has a magnitude based on the characteristics of said first material and said second material.

12. The method of claim 1, wherein said first signal is provided by an adjustable power supply.

13. The method of claim 1, wherein said first signal is provided by a fixed power supply.

14. The method of claim 1, wherein said welding is resistance welding, spot welding, stud welding, friction welding, or energy beam.

15. The method of claim 1, wherein said first material and said second material are solid wire, strand wire, rod-shaped, flat stock, pipe, or tubing.

16. The method of claim 1 wherein said material positioner further comprises a heat generator adapted for welding said first material and said second material to each other to produce a weld.

17. The method of claim 16, wherein actuation of said second positioning mechanism is adapted to provide a constant force between said first material and said second material during said heat generator welding.

18. The method of claim 16, wherein said weld is a butt joint or a lap joint.

19. The method of claim 7, wherein said first signal is a voltage, and wherein said voltage has a magnitude based on the characteristics of said first material and said second material.

20. The method of claim 7, wherein said first fixture comprises:
a first fixture upper member; and
a first fixture lower member with a first horizontal groove configured to cradle said first material.

* * * * *